(12) United States Patent
Kerner et al.

(10) Patent No.: US 10,666,345 B1
(45) Date of Patent: May 26, 2020

(54) PACKET DETECTION USING MULTIPLE ANTENNAS

(71) Applicant: APPLE INC., Cupertino, CA (US)

(72) Inventors: Michael Kerner, Tel Mond (IL); Shay Gershoni, Hadera (IL); Ido Kalderon, Rishon Lezion (IL)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/380,277

(22) Filed: Apr. 10, 2019

(51) Int. Cl.
    *H04B 7/10*     (2017.01)
    *H04L 1/02*     (2006.01)
    *H04B 7/08*     (2006.01)
    *H04L 27/26*     (2006.01)
    *H04L 25/03*     (2006.01)

(52) U.S. Cl.
CPC ..... *H04B 7/0851* (2013.01); *H04L 25/03006* (2013.01); *H04L 27/2602* (2013.01); *H04L 2025/0377* (2013.01); *H04L 2025/03815* (2013.01)

(58) Field of Classification Search
CPC . H04B 7/0851; H04B 7/0811; H04L 27/2602; H04L 25/03006; H04L 2025/03815; H04L 2025/0377

USPC .......... 375/347, 349, 316, 346, 267
See application file for complete search history.

(56) References Cited

U.S. PATENT DOCUMENTS

| | | | | |
|---|---|---|---|---|
| 5,446,922 | A * | 8/1995 | Siwiak ............. | H04B 7/0811 455/277.2 |
| 5,777,693 | A * | 7/1998 | Kishigami ....... | H04B 7/0811 348/725 |
| 7,274,759 | B2 * | 9/2007 | Meehan ........... | H04B 7/0811 375/347 |

* cited by examiner

*Primary Examiner* — Phuong Phu
(74) *Attorney, Agent, or Firm* — Fay Kaplun & Marcin, LLP (57) ABSTRACT

A device and method for a user equipment (UE) to perform packet detection using multiple receive antennas. The UE receives a first signal at two or more of the plurality of receive antennas. The UE determines a first combined signal parameter based on the first signal received at the two or more receive antennas. The UE receives a second signal at the two or more receive antennas. The UE determines a second combined signal parameter based on the second signal received at the two or more receive antennas. The UE detects a packet based on at least identifying a correlation between the first combined signal parameter and the second combined signal parameter.

20 Claims, 5 Drawing Sheets

PACKET DETECTION USING MULTIPLE ANTENNAS

BACKGROUND

A user equipment (UE) may be configured with a variety of different wireless communication capabilities. For example, the UE may be capable of exchanging packets with a further device in accordance with any of a plurality of different communication protocols. When establishing or maintaining a packet-based communication link, there may be a scenario where the UE expects to receive a packet from the further device but does not know exactly when the packet is to be received. Accordingly, the UE may perform packet detection. Initially, during packet detection, the UE may monitor a particular frequency band. Subsequently, the UE may process the signals received while monitoring the frequency band to determine whether a packet has been received by the UE.

A packet may include a plurality of symbols located at the beginning of the packet structure. The symbols may enable the UE to determine whether a packet has been transmitted to the UE. For example, the symbols may cause a particular type of channel response at the UE. Accordingly, when processing the signals received while monitoring the frequency band, the UE may differentiate between noise and a channel response associated with the symbols.

Various hardware and/or software mechanisms may be implemented to increase the range of a packet transmission. However, for a variety of different reasons, the repeating symbols may not benefit from these mechanisms. As a result, the UE may be located at a distance from the further device where the packet is capable of being delivered, but by the time the packet reaches the UE the repeating symbols may be undetectable. Accordingly, conventional packet detection techniques limit the range of the UE.

SUMMARY

According to an exemplary embodiment, a method may be performed by a user equipment (UE) configured with a plurality of receive antennas. The method includes receiving a first signal at two or more of the plurality of receive antennas. The method further includes, determining a first combined signal parameter based on the first signal received at the two or more receive antennas. The method further includes, receiving a second signal at the two or more receive antennas. The method further includes, determining a second combined signal parameter based on the second signal received at the two or more receive antennas. The method further includes, detecting a packet based on at least identifying a correlation between the first combined signal parameter and the second combined signal parameter.

According to another exemplary embodiment, a user equipment (UE) includes a transceiver configured to monitor a frequency band using a plurality of receive antennas. The UE further includes a processor configured to perform operations. The operations comprising determining a first combined signal parameter based on a first signal received at two or more of the plurality of receive antennas. The operations further comprising, determining a second combined signal parameter based on a second signal received at the two or more receiver antennas. The operations further comprising, detecting a packet based at least on identifying a correlation between the first combined signal parameter and the second combined signal parameter.

According to a further exemplary embodiment, an integrated circuit has circuitry configured to receive a first signal from two or more of a plurality of receive antennas. The integrated circuit further includes circuitry configured to determine a first combined signal parameter based on the first signal received from the two or more receive antennas. The integrated circuit further includes circuitry configured to receive a second signal from the two or more receive antennas. The integrated circuit further includes circuitry configured to determine a second combined signal parameter based on the second signal received from the two or more receive antennas. The integrated circuit further includes circuitry configured to detect a packet based at least on identifying a correlation between the first combined signal parameter and the second combined signal parameter.

DETAILED DESCRIPTION

The exemplary embodiments may be further understood with reference to the following description and the related appended drawings, wherein like elements are provided with the same reference numerals. The exemplary embodiments describe devices, systems and methods to improve packet detection by utilizing signals received at a plurality of antennas of a device. For example, a device may be configured with multiple receive antennas. During operation, the device may combine the signals received at multiple antennas prior to making a packet detection determination.

The exemplary embodiments are described with regard to a wireless local area network (WLAN). A person of ordinary skill in the art would understand that WLAN may refer to a network that operates in accordance with any of a plurality of different types of Institute of Electrical and Electronics Engineers (IEEE) 802.11 wireless communication protocols. These communication protocols may include, but are not limited to, 802.11a, 802.11b, 802.11g, 802.11n, 802.11ac, 802.11ax, etc. The WLAN may operate in several different frequency bands of the radio frequency (RF) spectrum. For example, the frequency bands may include, but are not limited to, the 900 megahertz (MHz), 2.4 gigahertz (GHz), 3.6 GHz, 4.9 GHz, 5 GHz, 5.9 GHz, 60 GHz bands, etc. Each band may include a plurality of channels. However, any reference to WLAN, a particular communication protocol or a particular frequency band is for illustrative purposes. The exemplary embodiments apply to any type of network that supports packet-based communication.

Throughout this description, packet detection may generally refer to the process of identifying the approximate start, e.g., edge, of a packet. This may include tuning a device's transceiver (e.g., baseband processor) to a particular frequency band. The device may then process the signals received while tuned to the frequency band to determine whether an indication of the presence of a packet can be identified.

A packet may have a packet structure that includes a preamble, a portion of which includes a symbol that repeats a plurality of times. Throughout this description, the portion of the packet that includes the plurality of repeating symbols may be referred to as a legacy short training field (L-STF). The L-STF may provide an indication of the presence of the packet. For example, when processing received signals, a device may be able to differentiate between noise and a channel response associated with the L-STF. However, any reference to L-STF is merely provided for illustrative purposes. The exemplary embodiments may apply to any type of packet structure that includes a similar type of indication. Further, the described embodiments may be practiced using any portion(s) of a packet, including any field or fields.

The exemplary embodiments are described with regard to a user equipment (UE). The UE may communicate with the WLAN via an access point (AP). To establish a communication link with the AP, the UE may perform initial acquisition to synchronize with the AP. One of the first operations performed during initial acquisition may be packet detection. If the start edge (or starting edge) of a packet is identified (e.g., through detection of the L-STF), subsequent operations may be performed on the other contents of the packet to establish/maintain the communication link and receive payload data. For example, after identifying the L-STF, the UE may determine whether the packet is intended for the UE. Other examples of subsequent operations may include, but are not limited to, fine and/or coarse carrier frequency offset (CFO), automatic gain control (AGC), channel estimation, antenna selection, diversity selection, frame synchronization, etc. Thus, accurate detection may be essential for the subsequent performance of a variety of different operations.

Under conventional circumstances, when the UE is configured with multiple receive antennas to perform packet detection, the UE may receive signals at each of the antennas. Subsequently, the UE may process the signals received at each antenna and make a packet detection determination for each individual antenna. In contrast, the exemplary embodiments relate to improving conventional packet detection by combining the signals received at multiple or all of the receiving antennas prior to determining whether an indication of a packet is present.

The exemplary embodiments are not limited to the above scenario in which the UE performs packet detection to establish a communication link with the AP of a corresponding WLAN. For example, the disclosed packet detection may be performed by the AP or by either device after the communication link has already been established. Throughout this description, any reference to a particular scenario or a particular device performing the disclosed packet detection operations is merely for illustrative purposes. The exemplary embodiments may apply to any device performing packet detection for any appropriate reason. These exemplary packet detection operations may be incorporated into existing packet detection processes, performed independently, or incorporated into future packet detection processes.

Figure 1:
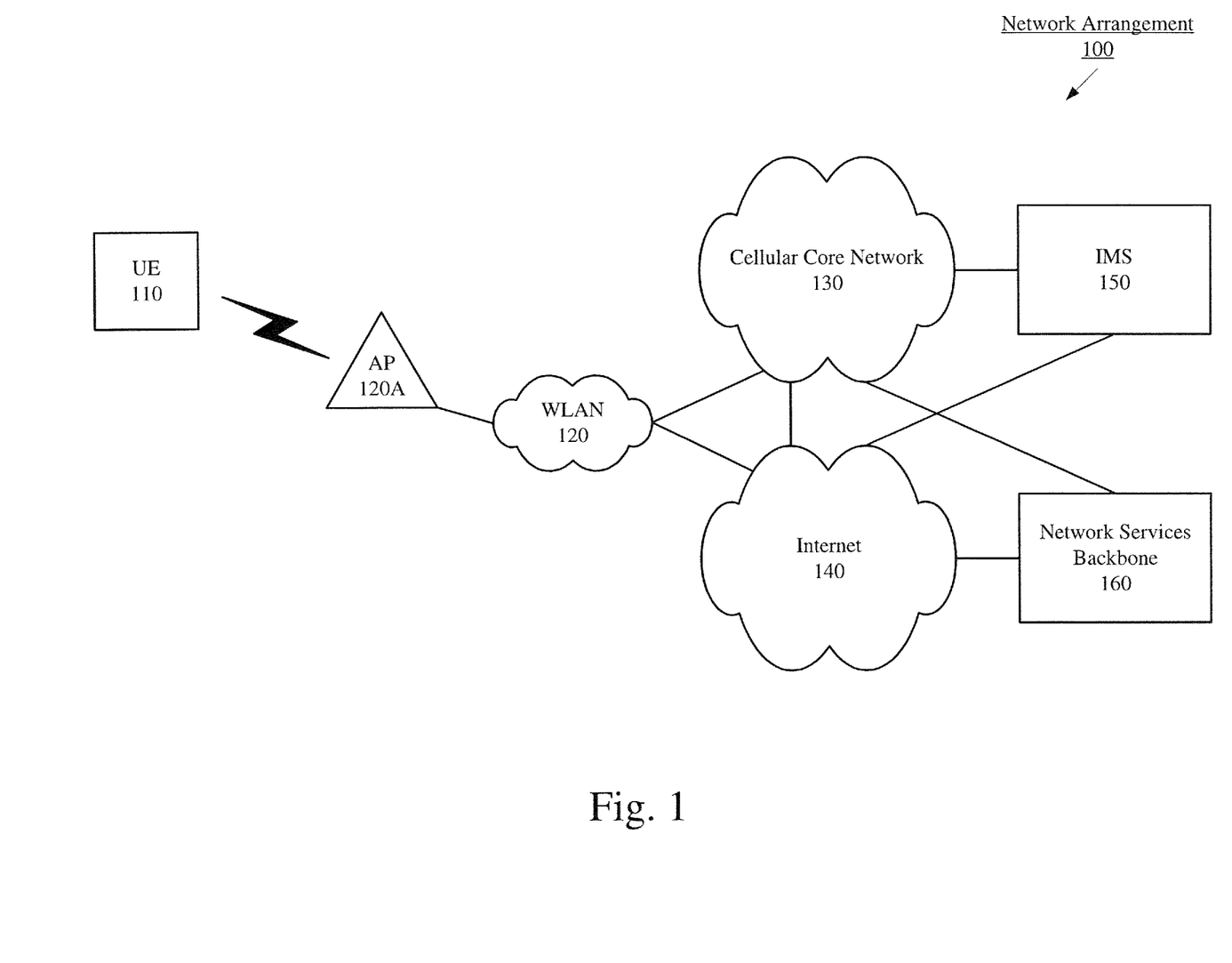
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

Further, the exemplary network arrangement 100 includes a wireless local access network (WLAN) 120. However, the UE 110 may also communicate with other types of networks and the UE 110 may also communicate with networks over a wired connection. Therefore, the UE 110 may include a WLAN chipset to communicate with the WLAN 120 and any of a plurality of further chipsets to communicate with other types of networks (e.g., 5G new radio (NR) radio access network (RAN), Long-Term Evolution (LTE) RAN, Legacy RAN, etc.).

The WLAN 120 may include any type of wireless local area network (WiFi, Hot Spot, soft AP, EEE 802.11 networks, etc.). WLANs may manage access to the network via any of a plurality of different hardware devices that are configured to send and/or receive traffic from UEs that are equipped with the appropriate WLAN chipset. In the exemplary network arrangement 100, the UE 110 may connect to the WLAN 120 via an access point (AP) 120A. However, reference to an AP is merely provided for illustrative purposes. The exemplary embodiments may apply to any type of device that manages access to a WLAN.

In addition to the WLAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of a cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
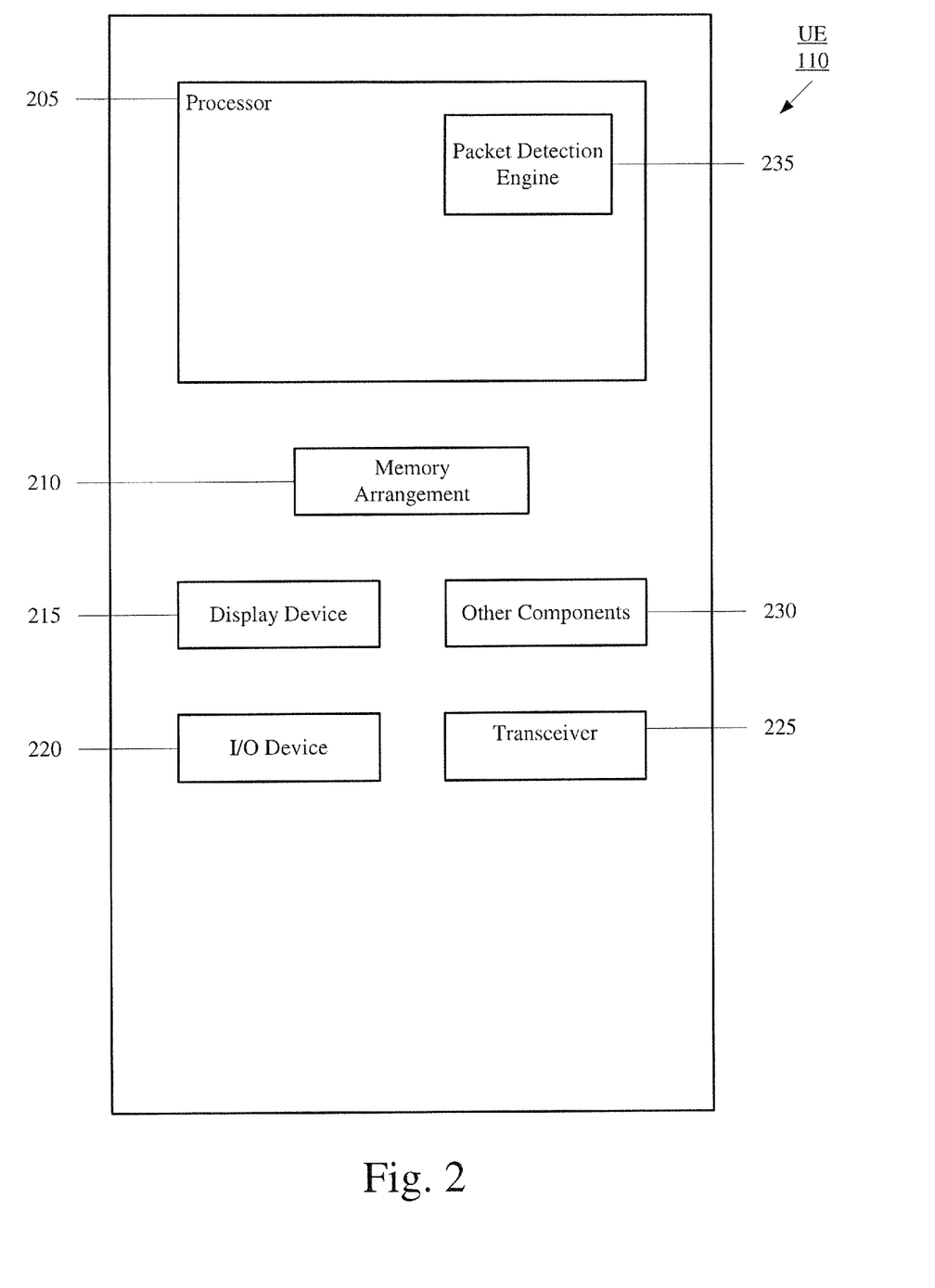
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines of the UE 110. For example, the processor 205 may execute a packet detection engine 235. The packet detection engine 235 may monitor the signals received at various antennas and determine whether an indication of a packet is present. The packet detection engine 235 being an application (e.g., a program) executed by the processor 205 is only exemplary. The functionality associated with the packet detection engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the WLAN 120 or any other type of network (e.g., a 5G NR RAN, a LTE RAN, a legacy RAN, etc.) Accordingly, the transceiver 225 may operate on a variety of different frequencies or channels (e.g., set of consecutive frequencies).

Figure 3:
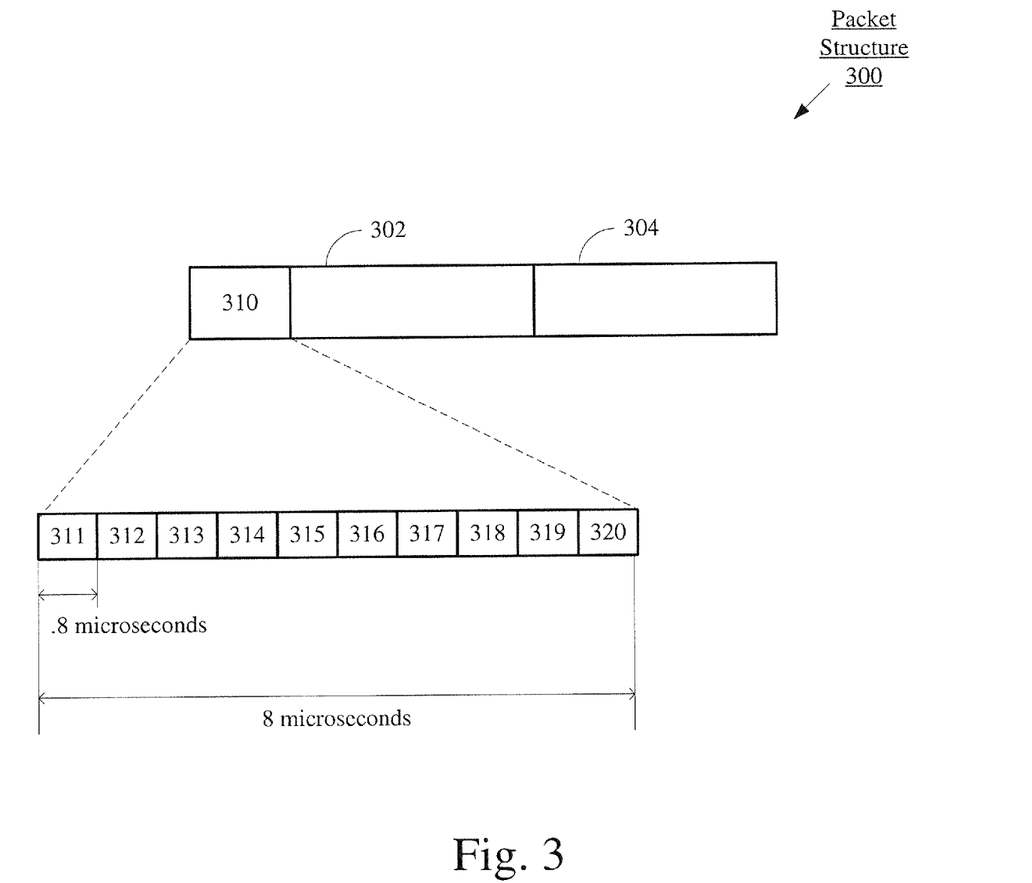
FIG. 3 shows an exemplary packet structure according to various exemplary embodiments.

FIG. 3 shows an exemplary packet structure 300 according to various exemplary embodiments. Different networks and different communication protocols may implement different types of packet structure. However, various different types of packet structures may include an L-STF. The exemplary packet structure 300 is only intended to provide an example of the general structure of an 802.11 packet with an L-STF. The particular contents of a packet may vary based on the particular type of 802.11 communication protocol (e.g., 802.11a, 802.11g, 802.11n, 802.11ax, etc.). Accordingly, the exemplary embodiments are not limited to any particular type of packet structure and may apply to any type of packet structure that includes L-STF or a similar type of indication as described herein with respect to the L-STF.

The exemplary packet structure 300 includes two general portions, a signal portion 302 and a data portion 304. The first part of the signal portion 302 may be the L-STF 310. In other implementations, the L-STF 310 can be included elsewhere in the packet. The configuration of the L-STF 310 may be known by the receiving device. As mentioned above, packet detection may occur when the receiving device is unaware of exactly when a packet may be received and when various characteristics of the communication link have not been determined. Accordingly, at the packet detection stage, the configuration of the L-STF 310 is part of the limited amount of information available for use by the receiving device when performing packet detection.

The L-STF 310 of the exemplary packet 300 may include, e.g., ten symbols 311-320. In some implementations, each of the symbols 311-320 may include a set of sixteen samples and have a 0.8 microsecond duration. Thus, the L-STF 310 may have a total duration of 8 microseconds. Further, each set of samples may be identical and thus, may generate a similar channel response at the receiving device. Accordingly, packet detection may be performed by identifying these correlated channel responses occurring approximately every 0.8 microseconds. Any reference to L-STF with a particular number of symbols, a particular number of samples, or a particular duration is merely for illustrative purposes. Any/all of these values may vary in other implementations. For instance, an L-STF may include more or fewer symbols, the symbols may have more or fewer (or different) samples, and the duration may be greater or smaller. The exemplary embodiments may apply to any type of packet structure that includes a similar type of indication.

The remaining contents of the signal portion 302 may be any of a variety of different types of information and/or data. As mentioned above, each particular type of 802.11 communication protocol (e.g., 802.11a, 802.11g, 802.11n, 802.11ax, etc.) may have a packet structure that contains different types of information and/or data. For example, the signal portion 302 may also contain information and/or data such as, but not limited to, a legacy long training field (L-LTF), a legacy signal field (L-SIG), a high throughput (HT) training field, a very high throughput (VHT) training field, etc. While packet detection may enable subsequent operations to be performed on the other contents of the signal portion 302, the other contents of the signal portion 302 may no support packet detection. Accordingly, the exemplary embodiments apply to a packet structure that includes any type of data and/or information in the signal portion 302.

Generally, the data portion 304 is located at the end of the packet and contains user payload data. As mentioned above, depending on the particular type of communication protocol, the data portion 304 may contain various different types of data and/or information. While packet detection may enable subsequent operations to be performed on the data portion 304, the process of packet detection may be performed without using the contents of the data portion 304. Accordingly, the exemplary embodiments apply to a packet structure that includes any type of data and/or information in the data portion 304.

Figure 4:
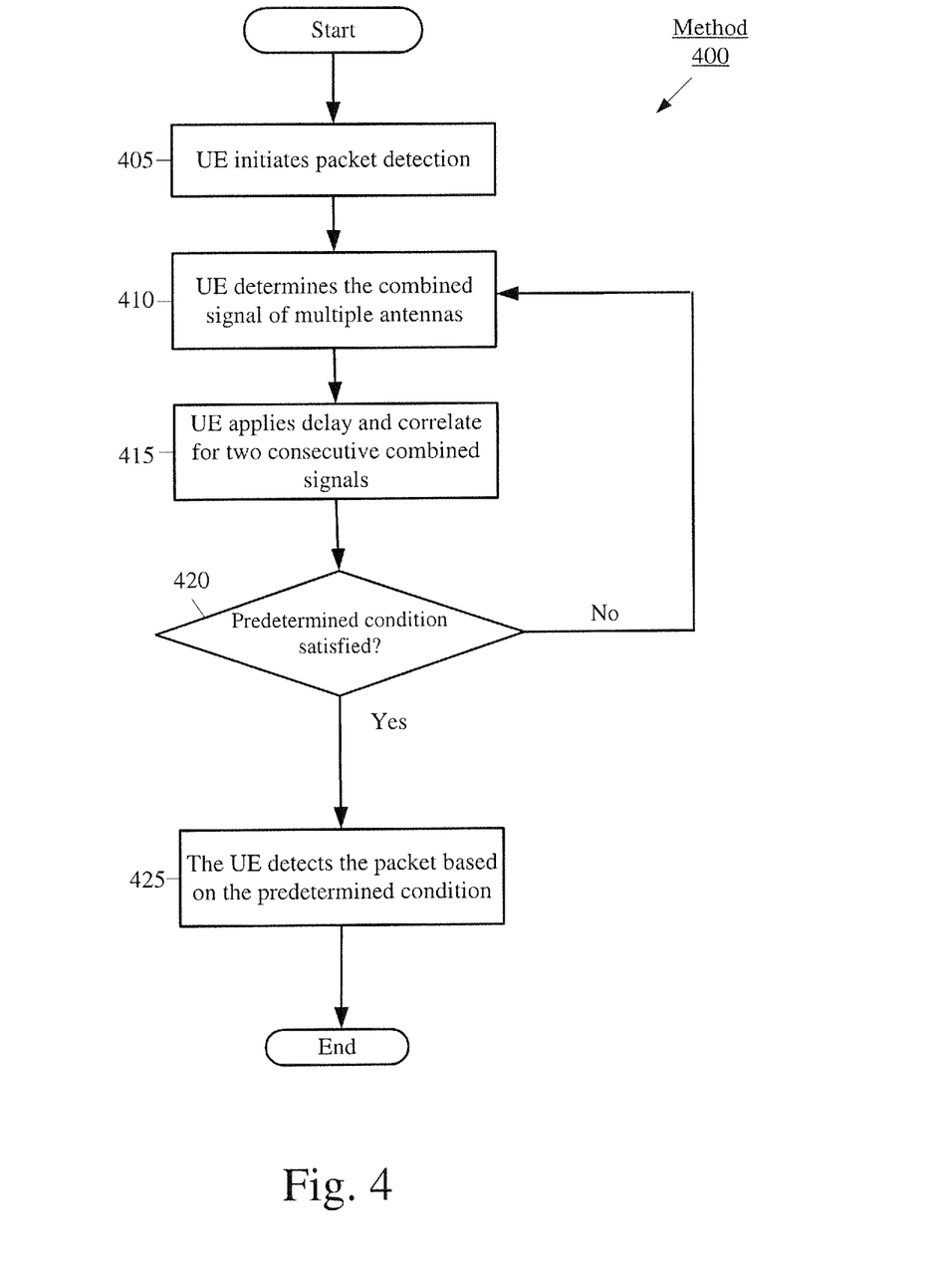
FIG. 4 shows an exemplary method for the UE to perform packet detection according to various exemplary embodiments.

FIG. 4 shows an exemplary method 400 for the UE 110 to perform packet detection according to various exemplary embodiments. The method 400 will be described with regard to the network arrangement 100, the UE 110 and the packet structure 300.

Consider the following exemplary scenario, the UE 110 has been triggered to initiate initial acquisition to establish a communication link with the AP 120A of the WLAN 120. The UE 110 is configured with two receive antennas and knows the configuration of the L-STF 310.

In 405, the UE 110 initiates packet detection. Accordingly, the UE 110 may tune its transceiver 225 to the frequency band associated with the WLAN 120. Thus, both receive antennas of the UE 110 may be configured to listen to the same frequency band.

As mentioned above, packet detection may be performed to determine when the approximate start edge of a packet is received by the UE 110. The L-STF 310 is located at the beginning of the packet structure 300. Accordingly, if the UE 110 can identify the channel response of the L-STF 310, the UE 110 may be able to identify the approximate start edge of the packet structure 300. Under conventional circumstances, the UE 110 may determine whether the L-STF 310 can be identified at each individual antenna. The exemplary method 400 improves conventional packet detection techniques by combining the signal received at each of the two antennas prior to making a packet detection determination. In other embodiments featuring a device with more than two antennas, signals received at two or more of the antennas can be combined prior to making a packet detection determination.

When tuned to listen to the frequency band associated with the WLAN 120, the UE 110 may process the signals received at multiple antennas and determine the corresponding channel response for each of those antenna. The channel response may include a plurality of channel taps and describe the input received at the corresponding antenna over time. For example, the L-STF 310 includes ten symbols 311-320. Each symbol 311-320 may include an identical set of sixteen samples and has a 0.8 microsecond duration. The reception of each symbol 311-320 may cause a channel tap. However, noise may also cause a channel tap. Thus, the UE 110 may identify the L-STF 310 amongst the noise based on the periodicity of the identical symbols 311-320 because the channel taps that result from the symbols 311-320 will correlate to one another while channel taps caused by noise should not correlate to one another.

In 410, the UE 110 determines the combined signal of the two receive antennas. In one exemplary embodiment, the UE 110 may continuously determine the combined signal of the first antenna and the second antenna. In another exemplary embodiment, the UE 110 may be triggered to calculate the combined signal when the received signal energy corresponding to at least one of the antennas is above a predetermined threshold. The predetermined threshold may provide an indication that a packet is being received. Thus, this threshold may prevent the UE 110 from performing additional operations when it is unlikely that a packet is being received.

A determination of the combined signal y may be seen below in equation 1.

$$y = y_1 + \beta \cdot y_2 \qquad \text{Equation 1}$$

Here, $y_1$ represents the received signal at a first receive antenna and $y_2$ represents the received signal at a second receive antenna. ß is a ratio of a one tap complex channel response at the first antenna $h_1$ and a one tap complex channel response at the second antenna $h_2$. Thus, $ß=h_2/h_1$.

As will be demonstrated in detail below, a delay and correlate operation may be applied to the combined signal. Delay and correlate can be implemented as an algorithm that determines whether the combined signal at a first time and a combined signal at a second time are correlated with one another. Thus, the output of delay and correlate may indicate to the UE 110 the approximate start edge of the packet. For example, since the repeating symbols 311-320 of the L-STF 310 are substantially identical, the symbols 311-320 correlate to one another. However, noise is random and uncorrelated. Accordingly, when a combined signal based on a first symbol of the corresponding L-STF 310 and a combined signal based on a second symbol of the corresponding L-STF 310 are input into the delay and correlate algorithm, the magnitude of the output should be higher than the output for two consecutive combined signals generated based on noise. Thus, the output may provide an indication of whether correlated signals (e.g., two of the plurality of symbols 311-320) or uncorrelated signals (e.g., noise) were received by the UE 110.

There may be a scenario where noise causes the output of delay and correlate to provide an indication of correlated signals. Accordingly, since the L-STF 310 includes more than two symbols, the UE 110 may determine the approximate start edge of the packet based on a plurality of consecutive outputs providing an indication of correlated signals.

For example, assume N hypothesis for ß (e.g., 2, 4, 7, 10). As mentioned above, ß is a ratio of a one tap complex channel response at the first antenna $h_1$ and a one tap complex channel response at the second antenna $h_2$. Initially, the UE 110 calculates the combined signal for a first channel response by calculating $y=y_1+\beta \cdot y_2$. The UE 110 applies delay and correlate to this combined signal. The output of delay and correlate for the combined signal of the first channel response provides an indication of whether the first channel response is correlated with a previously received signal. Subsequently, the UE 110 determines the combined signal for a second channel response and then applies delay and correlate. The output for the second channel response provides an indication of whether this combined signal is correlated with combined signal for the first channel response. The UE 110 may declare the approximate start edge of a packet when the UE 110 identifies that the output of each delay and correlate operation for N consecutive channel responses provides an indication of correlated signals. An example of the output of delay and correlate operation for consecutive channel responses is provided below with reference to FIG. 5.

Figure 5:
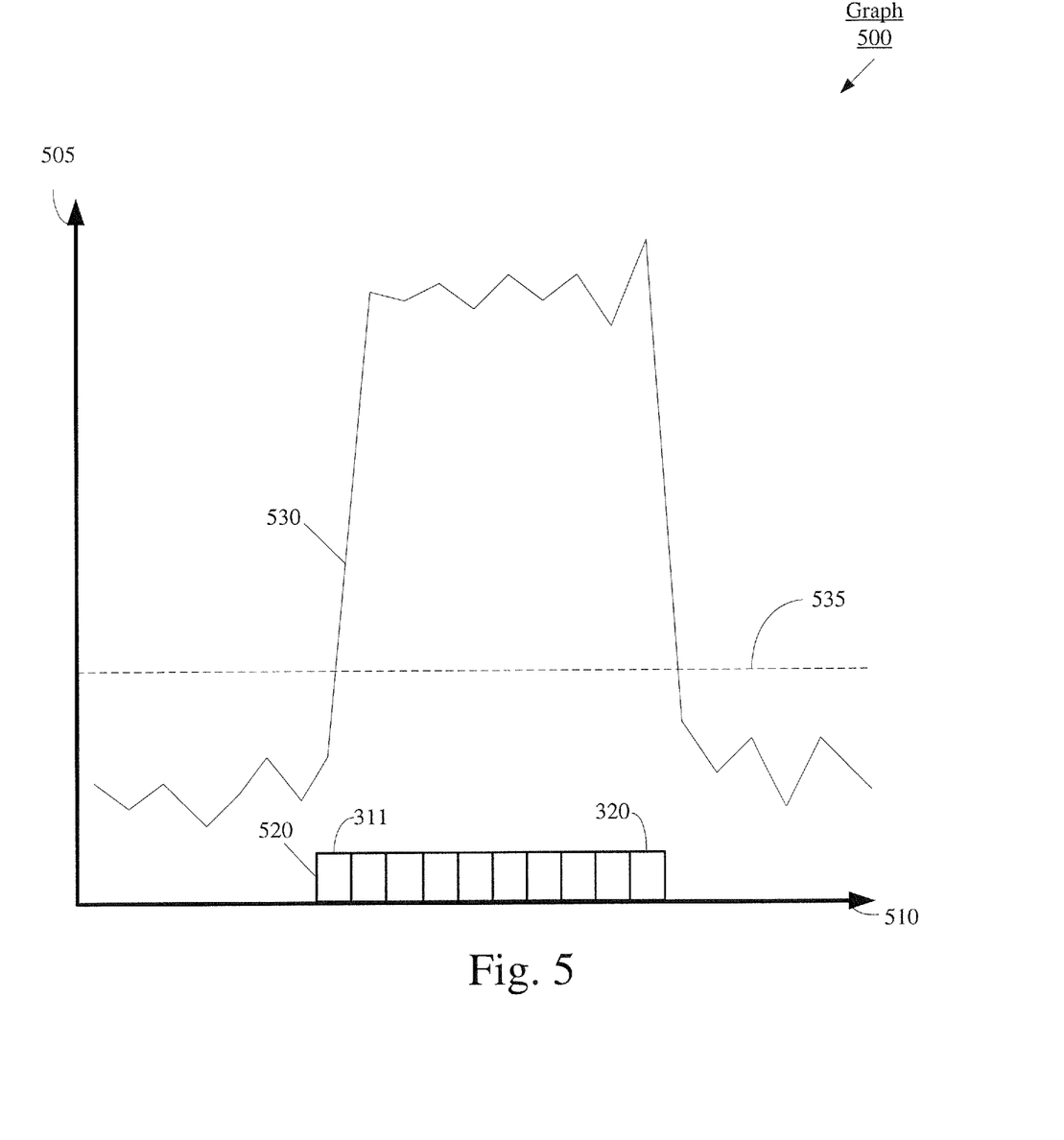
FIG. 5 shows a graph that illustrates an example of the output of the delay and correlate algorithm before, during and after the reception of the L-STF.

Returning to FIG. 4, in 415, the UE 110 applies delay and correlate based on two consecutive combined signals. If the combined signals are correlated to one another, the magnitude of the output of the algorithm is generally greater than if the combined signals are not correlated to one another. The output of the algorithm may be compared to a predetermined threshold. If the output satisfies the predetermined threshold, the two combined signals are likely to be correlated to one another. If the output does not satisfy the predetermined threshold, the combined signals are unlikely to be correlated to one another. Thus, the predetermined threshold may provide an indication of when one of the symbols 311-320 is received by the UE 110. The graph 500 provides an example of the output of the algorithm implemented in 415 and the specific parameters of the delay and correlate algorithm implemented in 415 will be demonstrated in further detail below with regard to equations 2-4.

FIG. 5 shows the graph 500 that illustrates an example of the output of the delay and correlate algorithm before, during and after the reception of the L-STF 310.

The graph 500 includes a timeline 520 and a line graph 530. The timeline 520 illustrates when the symbols 311-320 of the L-STF 310 are received at the UE 110. The line graph 530 illustrates the output of the delay and correlate algorithm of 415 before, during and after the reception of the symbols 311-320 of the L-STF 310 by the UE 110.

The x-axis 510 represents time. The timeline 520 shows when the reception of the symbols 311-320 occurs. The line graph 530 represents the output of the delay and correlate algorithm of 415. Each point on the line graph 530 demonstrates a value that indicates whether the signal received at that time correlates with a previously received signal. The level of the line graph 530 on the y-axis 505 illustrates the likelihood of a correlation. When a point is plotted above the threshold 535, the currently received signal is likely correlated to the previously received signal. When a point is plotted below the threshold 535, the currently received signal is unlikely to be correlated to the previously received signal. As mentioned above, since the symbols 311-320 of the L-STF 310 are identical, the symbols 311-320 are correlated to one another.

In this exemplary scenario, before the reception of the symbols 311-320, only noise is received. Noise is random and thus, consecutively received signals are not correlated with one another. Accordingly, when delay and correlate is applied to noise the results are generally flat. However, the magnitude of results for the delay and correlate algorithm increase when symbols 312-320 are received because each of those symbols is correlated to the previously received symbol. Since there is no symbol before the reception of symbol 311, the magnitude of the output of the delay and correlate algorithm does not increase above the threshold 535 until the reception of symbol 312. After the reception of symbol 320, the UE 110 may be receiving the remaining contents of the packet (e.g., signal portion 302, data portion 304). However, since the delay and correlate algorithm is based, in part, on the duration of the repeating symbols of the L-STF 310 (e.g., 0.8 microseconds) the delay and correlate algorithm generally does not output results with a magnitude above the threshold 535 for the remaining contents of the packet.

Returning to 415, the delay and correlate algorithm can be seen below in equation 2.

$$c(n) = \sum_{k=0}^{N-1} y(n+k) \cdot y^*(n+k+T) \quad \text{Equation 2}$$

Here, c(n) represent the output of the delay and correlate algorithm. The absolute value of this output is compared to the predetermined threshold 535. The line graph 530 of the graph 500 provides an example of the output of the algorithm over time. The parameter y(n) represents received samples (e.g., the symbols 311-320). The parameter k is the integration index of the summation and the parameter N is the length of the integration window. The parameter T represents the expected duration between repetitions (e.g., 0.8 microseconds).

Equation 3 seen below shows the combined signal of equation 1 incorporated into the delay and correlate algorithm of equation 2.

$$c(n) = \sum_{k=0}^{N-1} (y_1(n+k) + \beta \cdot y_2(n+k)) \cdot$$

$$(y_1^*(n+k+T) + \beta^* \cdot y_2^*(n+k+T)) = $$

$$\sum_{k=0}^{N-1} y_1(n+k) \cdot y_1^*(n+k+T) +$$

$$\|\beta\|^2 \sum_{k=0}^{N-1} y_2(n+k) \cdot y_2^*(n+k+T) +$$

$$\beta^* \sum_{k=0}^{N-1} y_1(n+k) \cdot y_2^*(n+k+T) +$$

$$\beta \sum_{k=0}^{N-1} y_2(n+k) \cdot y_1^*(n+k+T)$$

Equation 3

The complexity of equation 3 may be reduced by denoting $$A = \sum_{k=0}^{N-1} y_1(n+k) \cdot y_1^*(n+k+T)$$

$$B = \sum_{k=0}^{N-1} y_2(n+k) \cdot y_2^*(n+k+T) \text{ and}$$

$$C = \sum_{k=0}^{N-1} y_1(n+k) \cdot y_2^*(n+k+T).$$

Here, A represents the correlation of the currently received signal at the first antenna and a previously received signal at the first antenna (e.g., delayed signal). B represents the correlation of the currently received signal at the second antenna and a previously received signal at the second antenna. C represents the correlation of a currently received signal at the first antenna and a previously received signal at the second antenna. Equation 4 seen below shows a simplification of equation 3. Since packet detection may be performed continuously or frequently, reducing the complexity of the algorithm results in power saving benefits to the UE 110.

$$c(n) = A + \|\beta\|^2 B + \beta^* C + \beta C^* = A + \|\beta\|^2 B + \beta^* C + (\beta^* C)^* \quad \text{Equation 4}$$

The output of Equation 4 may be compared to a predetermined threshold. For example, the UE 110 may choose the max c(n) value over ß. As mentioned above, if the output of delay and correlate satisfies the predetermined threshold, two consecutive signals are likely to be correlated. If the output does not satisfy the predetermined threshold, the combined signals are unlikely to be correlated. During operation, the UE 110 may set N hypothesis for ß (e.g., 2, 4, 7, 10). The UE 110 may declare the approximate start edge of a packet when the UE 110 identifies that the output of equation 4 for N consecutive channel responses provides an indication of correlated signals.

In 420, the UE 110 determines whether a predetermined condition has been satisfied. The predetermined condition may indicate to the UE 110 that the approximate start edge of the packet has been identified. For example, the predetermined condition may be N consecutive outputs for the delay and correlate algorithm of 415 resulting in a value above the predetermined threshold 535. There may be instances where noise causes the output of the delay and correlate algorithm in 415 to exceed the predetermined threshold. By increasing the value of N, the likelihood that an L-STF 310 has been identified increases. In one exemplary embodiment, N may set to seven. In another exemplary embodiment N may be set to two. However, the exemplary embodiments are not limited to any particular predetermined condition and may apply to any appropriate predetermined condition that indicates that an approximate start edge of a packet has been identified.

The performance of a packet detection mechanism may be evaluated based on the probability that a packet detection signals when a packet is actually received and/or the probability of a false detection when a packet detection is indicated but a packet is not actually received. By increasing N, the probability that a packet detection signals when a packet is actually received increases and the probability of a false detection decreases. However, increasing N also increases the number of operations performed by the UE 110. Accordingly, N may be set to a value that balances power saving and adequate performance of the packet detection mechanism.

If the UE 110 determines that the predetermined condition is not satisfied in 420, the method 400 returns to 410 where the UE 110 once again combines the signals and applies the delay and correlate algorithm to the combined signals. If the UE 110 determines that the predetermined condition in 420 is satisfied, the method 400 continues to 425.

In 425, the UE 110 detects the packet based on the predetermined condition. By performing delay and correlate on a combined signal, the exemplary embodiments provide a packet detection mechanism that is more sensitive to the presence of a packet than conventional mechanisms. Accordingly, the packet detection mechanisms of the method 400 may increase the range of the UE 110.

The method 400 was described with regard to a UE 110 that is configured with two receive antennas. However, the exemplary embodiments are not limited to a UE with two receive antennas. The exemplary embodiments may apply to any appropriate number of receive antennas (e.g., 3, 5, 7, 9, etc.). As noted above, the packet detection mechanism can be performed based on signals received at any of two or more antennas.

Equation 5, as seen below provides an example of a determination of a combined signal when a UE 110 is configured with three receive antennas.

$$y = y_1 + \alpha \cdot y_2 + \beta \cdot y_3 \quad \text{Equation 5}$$

Here, $y_1$ represents the received signal at a first receive antenna, $y_2$ represents the received signal at a second receive antenna and $y_3$ represents the received signal at the third receive antenna. $\alpha$ is the ratio of a one tap complex channel response at the first antenna $h_1$ and a one tap complex channel response at the second antenna $h_2$. Thus, $\alpha = h_2/h_1$. In this configuration, ß is the ratio of a one tap complex channel response at the first antenna $h_1$ and a one tap complex channel response at the third antenna $h_3$. Thus, ß$=h_3/h_1$.

Equation 6, seen below, shows the combined signal of equation 5 incorporated into the delay and correlate algorithm of equation 2.

$$c(n) =$$
$$\sum_{k=0}^{N-1} (y_1(n+k) + \alpha \cdot y_2(n+k) + \beta \cdot y_3(n+k)) \cdot (y_1^*(n+k+T) +$$
$$\alpha^* \cdot y_2^*(n+k+T) + \beta^* \cdot y_3^*(n+k+T)) =$$
$$\sum_{k=0}^{N-1} y_1(n+k) \cdot y_1^*(n+k+T) +$$
$$\|\alpha\|^2 \sum_{k=0}^{N-1} y_2(n+k) \cdot y_2^*(n+k+T) +$$
$$\|\beta\|^2 \sum_{k=0}^{N-1} y_3(n+k) \cdot y_3^*(n+k+T) +$$
$$\alpha^* \sum_{k=0}^{N-1} y_1(n+k) \cdot y_2^*(n+k+T) +$$
$$\beta^* \sum_{k=0}^{N-1} y_1(n+k) \cdot y_3^*(n+k+T) +$$
$$\alpha \sum_{k=0}^{N-1} y_1^*(n+k) \cdot y_2(n+k+T) +$$
$$\alpha \cdot \beta^* \sum_{k=0}^{N-1} y_2(n+k) \cdot y_3^*(n+k+T) +$$
$$\beta \sum_{k=0}^{N-1} y_1^*(n+k) \cdot y_3(n+k+T) +$$
$$\beta \cdot \alpha^* \sum_{k=0}^{N-1} y_2^*(n+k) \cdot y_3(n+k+T) \quad \text{Equation 6}$$

The complexity of equation 3 may be reduced by denoting $$A = \sum_{k=0}^{N-1} y_1(n+k) \cdot y_1^*(n+k+T),$$
$$B = \sum_{k=0}^{N-1} y_2(n+k) \cdot y_2^*(n+k+T),$$
$$C = \sum_{k=0}^{N-1} y_3(n+k) \cdot y_3^*(n+k+T),$$
$$D = \sum_{k=0}^{N-1} y_1(n+k) \cdot y_2^*(n+k+T),$$
$$E = \sum_{k=0}^{N-1} y_1(n+k) \cdot y_3^*(n+k+T),$$
$$F = \sum_{k=0}^{N-1} y_2(n+k) \cdot y_3^*(n+k+T).$$

Here, A represents the correlation of the currently received signal at the first antenna and a previously received signal at the first antenna (e.g., delayed signal). B represents the correlation of the currently received signal at the second antenna and a previously received signal at the second antenna. C represents the correlation of the currently received signal at the third antenna and a previously received signal at the third antenna. D represents the correlation of the currently received signal at the first antenna and a previously received signal at the second antenna. E represents the correlation of the currently received signal at the first antenna and a previously received signal at the third antenna. F represents the correlation of the currently received signal at the second antenna and a previously received signal at the third antenna.

Equation 7, seen below, shows a simplification of equation 6.

$$c(n) = A + \|\alpha\|^2 B + \|\beta\|^2 C + \alpha^* D + \beta^* E + \alpha D^* + \alpha \beta^* F + \beta E^* + \alpha^* \beta F^* \quad \text{Equation 7}$$

The exemplary packet detection processes described above relate to a UE configured with two receive antennas and a UE configured with three receive antennas. A person of ordinary skill in the art would understand how to apply the exemplary packet detection processes to a receiving device configured with any number of additional receive antennas. Also, as noted above, fewer than all antennas of a device can be used to perform the packet detection process.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure.

Thus, it is intended that the present disclosure cover modifications and variations of this disclosure provided they come within the scope of the appended claims and their equivalent.

What is claimed:

1. A method, comprising:
at a user equipment (UE) configured with a plurality of receive antennas:
receiving a first signal at two or more of the plurality of receive antennas;
determining a first combined signal parameter based on the first signal received at the two or more receive antennas;
receiving a second signal at the two or more receive antennas;
determining a second combined signal parameter based on the second signal received at the two or more receive antennas; and
detecting a packet based on at least identifying a correlation between the first combined signal parameter and the second combined signal parameter.

2. The method of claim 1, wherein the first signal corresponds to a first symbol of a plurality of symbols included in a signal portion of the packet.

3. The method of claim 2, wherein the second signal corresponds to a second symbol of the plurality of symbols, wherein the second symbol is adjacent to and follows the first symbol.

4. The method of claim 3, wherein the first and second symbols each include a same set of samples.

5. The method of claim 3, wherein the plurality of symbols are included in a legacy short training field (L-STF).

6. The method of claim 1, wherein the first combined signal parameter is further based on a ratio of (i) a first complex channel response parameter corresponding to a first antenna of the plurality of antennas and (ii) a second complex channel response parameter corresponding to a second antenna of the plurality of antennas.

7. The method of claim 1, wherein identifying the correlation is based at least on performing a delay and correlate operations with respect to the first combined signal parameter and the second combined signal parameter.

8. The method of claim 7, wherein identifying the correlation is further based on an output of the delay and correlate operations satisfying a predetermined threshold.

9. The method of claim 1, further comprising:
determining a plurality of further combined signal parameters;
wherein detecting the packet is further based on a predetermined condition and wherein the predetermined condition is based on identifying a predetermined number of consecutive correlations from the plurality of further combined signal parameters.

10. The method of claim 1, wherein detecting the packet includes identifying a start edge of the packet.

11. The method of claim 1, wherein the packet is formatted in accordance with a wireless local area network (WLAN) communication protocol.

12. A user equipment (UE) comprising:
a transceiver configured to monitor a frequency band using a plurality of receive antennas; and
a processor configured to perform operations comprising:
determining a first combined signal parameter based on a first signal received at two or more of the plurality of receive antennas;
determining a second combined signal parameter based on a second signal received at the two or more receiver antennas; and
detecting a packet based at least on identifying a correlation between the first combined signal parameter and the second combined signal parameter.

13. The UE of claim 12, wherein the first signal corresponds to a first symbol of a plurality of symbols included in the packet and wherein the second signal corresponds to a second symbol of the plurality of symbols included in the packet, wherein the second symbol is adjacent to and follows the first symbol.

14. The UE of claim 13, wherein the plurality of symbols repeat for a time duration and wherein the time duration is based on the corresponding communication protocol.

15. The UE of claim 12, wherein the first combined signal parameter is further based on a ratio of (i) a first complex channel response parameter corresponding to a first antenna of the plurality of antennas and (ii) a second complex channel response parameter corresponding to a second antenna of the plurality of antennas.

16. The UE of claim 12, wherein the plurality of symbols are included in a legacy short training field (L-STF).

17. The UE of claim 12, wherein identifying the correlation is based on applying a delay and correlation to the first combined signal parameter and the second combined signal parameter.

18. The UE of claim 17, wherein identifying the correlation is further based on an output of the delay and correlate operation satisfying a predetermined threshold.

19. The UE of claim 12, wherein detecting the packet includes identifying an indication associated with the start edge of the packet.

20. An integrated circuit, comprising:
circuitry configured to receive a first signal from two or more of a plurality of receive antennas;
circuitry configured to determine a first combined signal parameter based on the first signal received from the two or more receive antennas;
circuitry configured to receive a second signal from the two or more receive antennas;
circuitry configured to determine a second combined signal parameter based on the second signal received from the two or more receive antennas; and
circuitry configured to detect a packet based at least on identifying a correlation between the first combined signal.

* * * * *